J. A. BURLEIGH.
COMPOUND VALVE.
APPLICATION FILED AUG. 2, 1910.

998,672.

Patented July 25, 1911.

Witnesses
C. H. Walker
Rose Berg

Inventor
John A. Burleigh
By Geo. E. Tew
Attorney

UNITED STATES PATENT OFFICE.

JOHN A. BURLEIGH, OF OLEAN, NEW YORK.

COMPOUND VALVE.

998,672.　　　　　Specification of Letters Patent.　　Patented July 25, 1911.

Application filed August 2, 1910. Serial No. 575,138.

*To all whom it may concern:*

Be it known that I, JOHN A. BURLEIGH, a citizen of the United States, residing at Olean, in the county of Cattaraugus and State of New York, have invented certain new and useful Improvements in Compound Valves, of which the following is a specification.

This invention relates to compound valves particularly adapted and intended for the control of the inlet to and the exhaust from a cylinder used in a glass bottle making machine for which I am about to apply for a patent, but capable of use in other constructions, in fact anywhere it may be desired to employ a valve for permitting the passages of fluid in opposite directions from and to inlet and exhaust pipes. By means of this valve air or other fluid pressure may for example be admitted to one end of a cylinder and exhausted from the other end, and vice versa, for the purpose of reciprocating a piston in said cylinder.

A feature of the invention is that the valve passages are provided with means for controlling the same, whereby the pressure flow in either direction may be controlled according to local conditions, which is highly advantageous where for example it may be desired to move a piston in one direction at one rate of speed and in the other direction at another rate, the controlling means serving to govern the flow irrespective of the throw of the main valve. Accordingly the main valve may be operated instantly to its full extent, but the flow will nevertheless be controlled to the desired rate or quantity.

The valve is illustrated in the accompanying drawings in which—

Figure 1:
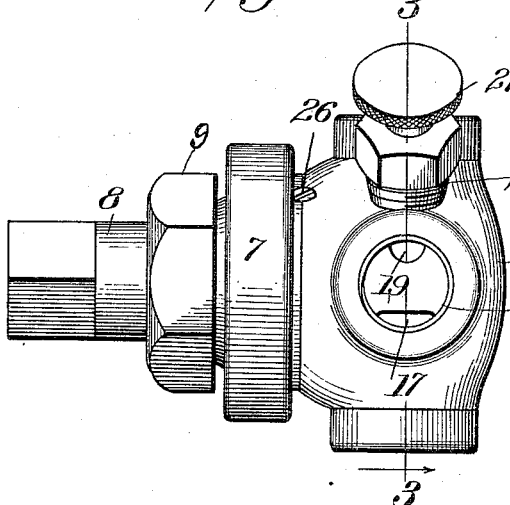
Figure 2:
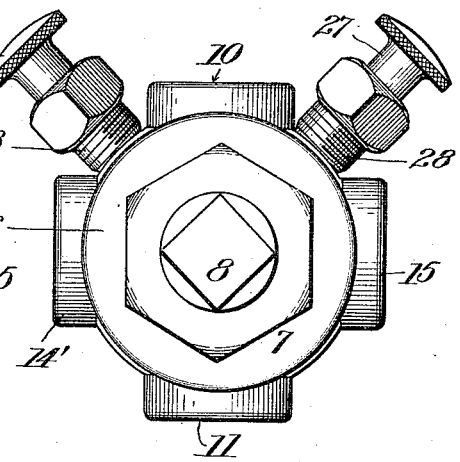
Figure 3:
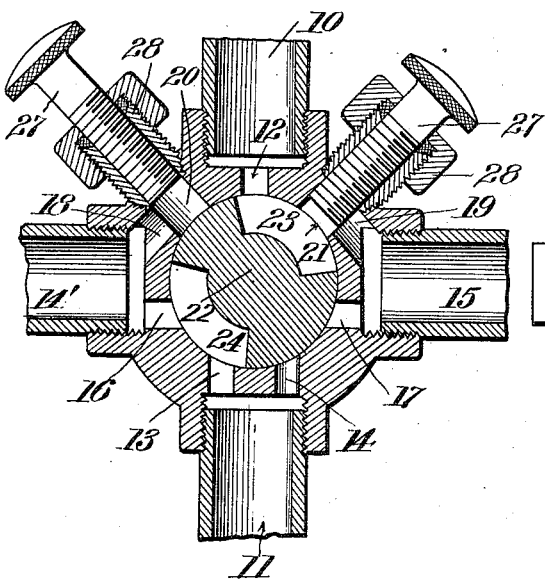
Figure 4:
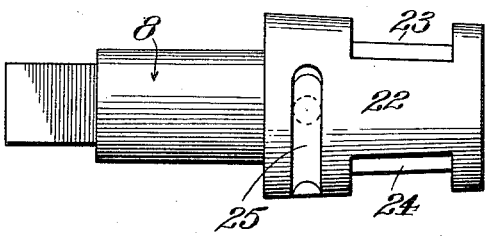

Figure 1 is a side elevation thereof. Fig. 2 is an end elevation. Fig. 3 is a section on the line 3—3 of Fig. 1. Fig. 4 is a plan of the valve plug.

The valve is of the turning plug type, and the flow therethrough as hereinafter described is controlled by a quarter turn of the plug, first one way and then the other.

Referring specifically to the drawings, 6 indicates a globular valve casing, with a screw cap 7 through which the stem 8 of the plug extends, and a ring packing nut 9 on said cap. By removal of the cap the plug may be withdrawn from the casing.

The inlet to the valve casing is indicated at 10, and an exhaust outlet at 11, on the opposite side of the casing to the inlet. The inlet pipe opens into the body of the valve through a port 12 and the exhaust communicates with the body of the casing through ports 13 and 14, the former of which may conveniently be a slot and the latter a circular bore. Arranged at a right angle to the inlet and exhaust pipes, and on opposite sides of the casing respectively, is the connecting pipe 14' which may be extended to one end of the cylinder and the connecting pipe 15 to the other end of the cylinder. The pipe 14' opens into the body of the valve through a port 16, and the pipe 15 through a similar port 17, these ports being disposed or offset toward the exhaust, since they are used only for the exhaust flow. The pipes 14' and 15 also communicate with the body of the valve through passages 18 and 19 respectively, which are bored or otherwise produced in the valve casing and which extend therein toward the inlet 10, opening into the body through ports 20 and 21 respectively, and in the operation of the valve these ports 20 and 21 will be alternately placed in communication with the inlet port 12. The body 22 of the valve plug has on one side a segmental recess 23 and on the other side a segmental recess 24. The former is of sufficient length to connect the ports 12 and 20 or 21, and the latter is of sufficient length to connect the ports 13 and 16 or 14 and 17. The plug also has a segmental groove 25 which receives a screw 26 inserted through the casing to limit the movement of the valve plug. Each of the ports 20 and 23 is controlled by a screw plug or supplemental valve 27 which screws through a bushing 28 tapped into the casing in line with said port, and these screw plugs serve to control the amount of flow through the ports 20 and 21 when said ports, by manipulation of the main plug 22, are respectively connected to the inlet port 12.

When the valve is in the position shown in Fig. 3, for example, the fluid under pressure enters through the port 12 and thence through the recess 23, port 21, and passage 19 to the pipe 15 leading in one direction, and the flow through said port 21 will be controlled by the position of the screw plug 27 which may be set or adjusted as desired. At the same time the pipe 14' is connected through port 16, recess 24 and port 13 to the exhaust pipe 11, permitting exhaust from said pipe 14', to the atmosphere or otherwise. By giving the valve a quarter turn the ports 12 and 20 are connected, and the ports 14 and 17, permitting inflow of the pressure to the pipe 14′, and exhaust from the pipe 15, the inflow being controlled as before by the plug 27 at the port 20.

Having thus described the invention, what I claim as new and desire to secure by Letters Patent is:—

A compound valve comprising a casing having an inlet port and an exhaust port opposite each other, and delivery pipes leading from opposite sides of the casing between said ports, said casing having one passage communicating with each delivery pipe and disposed toward the inlet and a separate passage communicating with each delivery pipe and disposed toward the exhaust, a turning plug in the casing, having recesses on opposite sides adapted to respectively connect the inlet port and one of the passages to one of the delivery pipes, and the exhaust port and one of the passages to the other delivery pipe, and having a solid part adapted to close the other passages to the respective delivery pipes, and supplemental valves in the casing controlling the passages from the inlet to the delivery pipes.

In testimony whereof, I affix my signature in presence of two witnesses.

JOHN A. BURLEIGH.

Witnesses:
J. L. CLYDE,
F. E. COLLINS.

---

Copies of this patent may be obtained for five cents each, by addressing the "Commissioner of Patents, Washington, D. C."